United States Patent
Lintz et al.

[11] Patent Number: 5,989,736
[45] Date of Patent: Nov. 23, 1999

[54] CARBON FIBER AND CERAMIC FIBER PAPER COMPOSITES AND USES THEREFOR

[75] Inventors: Timothy S. Lintz, Grand Island; Christopher B. Robinson, Williamsville; Mark D. Stahlman, Lewiston, all of N.Y.

[73] Assignee: Unifrax Corporation, Niagara Falls, N.Y.

[21] Appl. No.: 08/866,643

[22] Filed: May 30, 1997

[51] Int. Cl.[6] .................................................. B32B 9/00
[52] U.S. Cl. ......................... 428/688; 428/195; 428/113; 428/325; 280/728.1; 501/95.1
[58] Field of Search .................... 428/113, 212, 428/325, 688, 195; 280/728.1; 55/520; 501/95.1

[56] References Cited

U.S. PATENT DOCUMENTS

| | | | |
|---|---|---|---|
| 4,806,206 | 2/1989 | Kamijo et al. | 162/145 |
| 4,968,467 | 11/1990 | Zievers | 264/62 |
| 5,017,522 | 5/1991 | Hegedus | 501/81 |
| 5,053,107 | 10/1991 | Barber, Jr. | 162/145 |
| 5,098,454 | 3/1992 | Carpentier et al. | 55/523 |
| 5,145,811 | 9/1992 | Lintz et al. | 501/95 |
| 5,304,330 | 4/1994 | Tatarchuk et al. | 264/61 |
| 5,320,791 | 6/1994 | Saitou et al. | 264/63 |
| 5,419,975 | 5/1995 | Lintz et al. | 428/688 |
| 5,567,536 | 10/1996 | Lintz et al. | 428/688 |

OTHER PUBLICATIONS

"Carborundum: a containing commitment to quality"*Ceramic Bulletin*, vol. 69, No. 3, 1990, pp. 345–348.
"ASTM Inflatable Restraint Standards", by Richard M. Downs, Jr.,*ASTM Standardization News*, Jul. 1991.
"Ceramic Fiber Papers: Insulation for Earthly Industries and Beyond", by Douglas J. Bailey.
"Novoloid Fibers", by Joseph S. Hayes, Jr., *Kirk–Othmer: Encyclopedia of Chemical Technology*, vol. 16, Third Edition, pp. 125–138, John Wiley & Sons, 1981.
"Kynol", Brochure, 24 pages.
"Thornel: Product Information", Amoco, 3 pages.
"FORTAFIL ® 8808A Material Safety Data Sheet", Akzo, Aug. 15, 1988, 2 pages.
"Technical Data Sheet 902E: FORTAFIL ® Carbon Fibers Chopped Grades Selector Chart", Akzo, 1 page.
"Technical Data Sheet 902A: FORTAFIL ® 3(C) Continuous Carbon Fiber", Akzo, 1990, 1 page.

*Primary Examiner*—Deborah Jones
*Assistant Examiner*—Abraham Bahta
*Attorney, Agent, or Firm*—Renner, Kenner, Greive, Bobak, Taylor, Weber

[57] ABSTRACT

A paper composite includes activated carbon fibers and inorganic fibers bound together by an organic latex binder. Such a ceramic paper is useful in a variety of applications and is particularly useful as a filter media in the filter unit of an inflator in an automotive airbag. The filter media is particularly suitable for use with non-azide generants within an airbag inflator.

28 Claims, 1 Drawing Sheet

CARBON FIBER AND CERAMIC FIBER PAPER COMPOSITES AND USES THEREFOR

TECHNICAL FIELD

The present invention relates generally to ceramic paper and, more particularly, to paper composites of the type used as hot gas filter media in the filter units of airbag inflators in the automotive industry. The filter media is particularly suitable for use with non-azide, as well as azide, generants within an airbag inflator, and includes activated carbon fibers as well as refractory ceramic fibers to meet the various filtration requirements of the automotive airbag inflator industry.

BACKGROUND OF THE INVENTION

Ceramic paper generally refers to high temperature resistant, insulating inorganic sheet material having a thickness of up to about ¼ of an inch and predominantly comprising ceramic fibers. Such materials are referred to as "paper" because of their resemblance to wood pulp papers and because they can be produced on conventional paper-making machines. Such paper is used for a wide variety of industrial applications. More recently, the automotive industry has become interested in ceramic paper for use in the inflator filter units of automotive airbags.

For several years, automotive airbag manufacturers have sought ways to reduce costs by making more efficient use of the very expensive propellant or generant contained therein. One way that automotive airbag manufacturers have attempted to do this is to design inflators which burn hotter. It has been found that the hotter the generant systems within the inflators burn, the more optimum the completion of the reaction which, in turn, allows the airbag manufacturer to use less propellant or generant in the inflator, thereby reducing cost.

For many years, azide generant systems which include an azide component, such as sodium azide, have been utilized. In conjunction therewith, compatible filtration media was developed which typically centered on the use of fiberglass and/or ceramic fiber papers. Such papers typically comprised refractory ceramic fibers bound together by a latex binder system. However, often the latex binder was "burned out" so as to minimize additional organic components. These ceramic papers served three main functions in the typical inflator containing azide generants. First, the papers had to filter out the unwanted solid and liquid by-products left over from the combustion reaction of the azide generants. This meant that the papers had to have the proper mechanical means for entrapping the solid metal waste and the proper chemical means for entrapping the liquid metal oxide waste. Second, the papers had to control the flow rate of the nitrogen gas as it exited the inflator so as to fill the airbag properly. In other words, the papers had to have the proper porosity. Third, the papers served as insulators. The nitrogen gas liberated from the combustion reaction with the inflator needed to be cooled from approximately 2000° F. (1093° C.) to about 200° F. (93° C.). These fibers, in conjunction with the wire mesh which served as a heat sink, enabled the paper to serve as a barrier to heat. Thus, these prior art papers perform effectively when azide generants are utilized.

Recently, however, non-azide generants have been introduced to the automotive airbag industry. The use of these non-azide generants in airbag inflators is seen as a technological improvement over prior azide generants since many of these new non-azide generant systems burn much hotter and at higher pressures than their azide predecessors. Furthermore, these non-azide generants, e.g., guanidine, are not mutagenic and have a low toxicity as compared to the sodium azide generant which is mutagenic and toxic.

As a result of this advancement in the use of non-azide generants in airbag inflators, the filter media requirements for these new generant systems have changed significantly as well. That is, current refractory ceramic filter media used with azide generant inflators do not work as well with the non-azide technology because the non-azide inflators generate less reactive and smaller particle size by-products than their azide predecessors and produce chemically different by-products, including gases. Moreover, the filter media tends to load up with particulate and rupture under the higher temperature and pressure conditions associated with their use. In other words, while the refractory ceramic papers which act as filter media for azide generant systems continue to perform the latter two functions adequately (i.e., to control the flow rate of the nitrogen gas and to act as an insulator) for non-azide generants systems, they do not as effectively filter out the resultant by-products of the combustion reaction. Thus, conventional refractory ceramic filter papers do not work as well in these non-azide applications.

Accordingly, the need exists for a paper composite suitable for use as a hot gas filter media with non-azide, as well as azide, generants.

Heretofore, the use of carbon fibers in filtration paper technology and, more particularly, airbag inflator filter technology has, upon information and belief, been extremely limited. It is believed that carbon fiber paper containing carbon polyacrylonitrile (PAN) and carbon pitch fibers has heretofore been used as one ply of a two-ply sandwich wherein refractory ceramic fibers comprised the ceramic paper used in the other ply. However, these carbon fibers are not surface activated, have relatively low surface area, and have high tensile properties associated with rigidity and strength, not flexibility and filtering. Moreover, it is possible that such carbon fibers could give off other undesirable by-products. No single-ply paper composite containing both activated carbon fibers and refractory ceramic fibers is believed known, particularly for use as the filter in the inflator unit of an automotive airbag.

SUMMARY OF INVENTION

It is a primary object of the present invention to provide a paper composite suitable for use as a hot gas filter media.

It is another object of the present invention to provide a paper composite, as above, which includes both activated carbon fibers and refractory ceramic fibers in one single ply.

It is still another object of the present invention to provide a hot gas filtration media which effectively serves as an insulator and significantly lowers the temperature of any gas propelled therethrough.

It is yet another object of the present invention to provide a hot gas filtration media, as above, which effectively controls the flow rate of any gas propelled therethrough.

It is still another object of the present invention to provide a hot gas filtration media, as above, which effectively filters out unwanted solid, liquid and by-products of non-azide, as well as azide, generant systems.

It is a further object of the present invention to provide an inflator filter unit for use in airbags, wherein the filter unit includes a filter paper composite which includes both activated carbon fibers and refractory ceramic fibers.

It is still a further object of the present invention to provide a non-azide inflator filter unit, as above, which is less expensive to manufacture, lighter, and more environmentally friendly than its azide counterpart.

At least one or more of the foregoing objects, together with the advantages thereof over the known art relating to airbag inflators and ceramic paper composites which shall become apparent from the specification which follows, are accomplished by the invention as hereinafter described and claimed.

In general the present invention provides a single-ply paper composite comprising activated carbon fibers, inorganic fibers, and binder for bonding, or otherwise holding, the carbon fibers and the inorganic fibers together.

Other aspects of the invention which will become apparent herein are attained by a filter media for use in an inflator unit of an airbag comprising: a paper composite containing activated carbon fibers and inorganic fibers.

The present invention also includes a filter for use in an inflator unit of an automotive airbag comprising a paper composite including activated carbon fibers and inorganic fibers.

BRIEF DESCRIPTION OF THE DRAWING

The drawing figure is a sectional view of an airbag module having an inflator filter unit according to the concepts of the present invention.

PREFERRED EMBODIMENT FOR CARRYING OUT THE INVENTION

Figure 1:
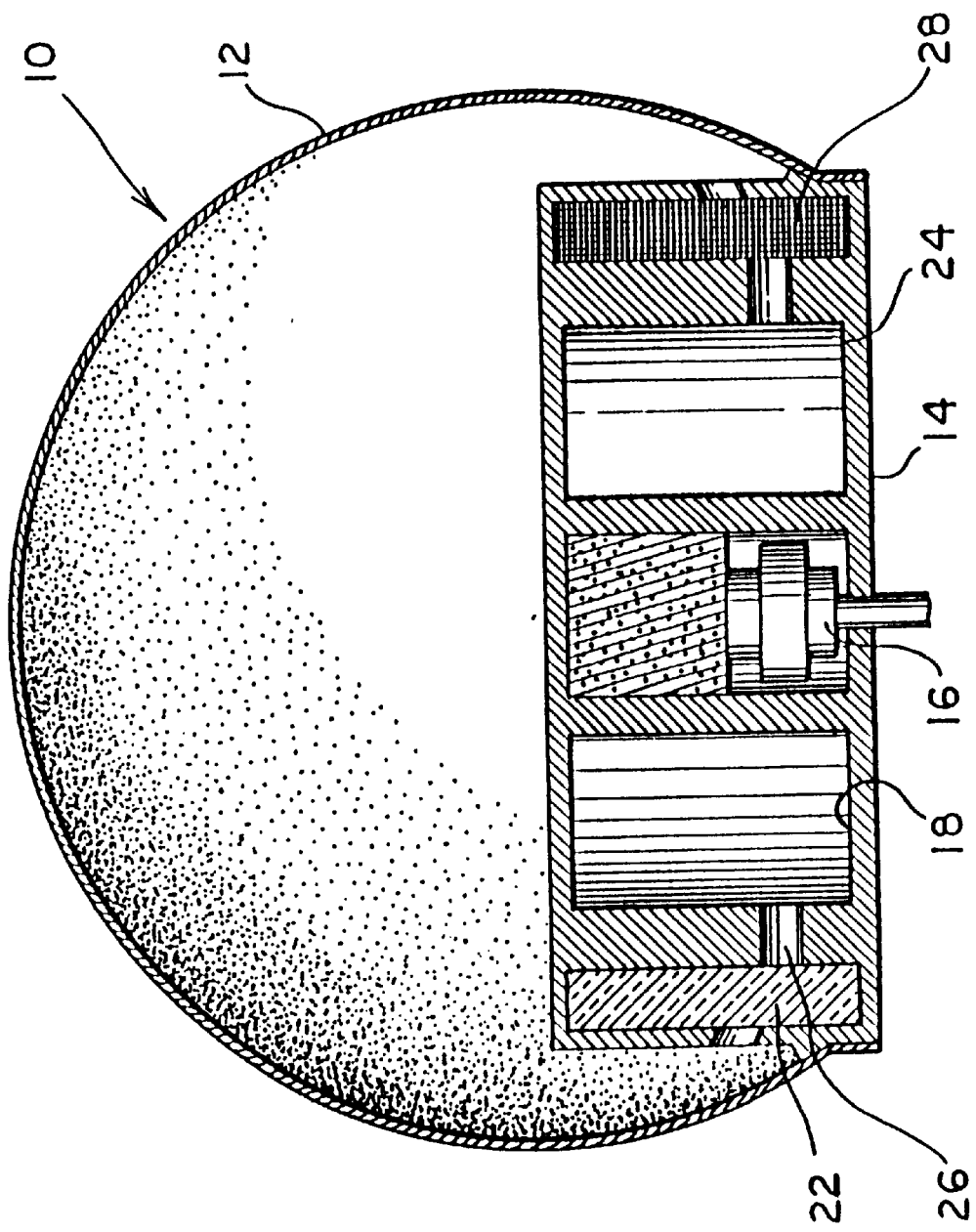

The present invention is directed toward paper composite suitable for use as a hot gas filtration media and, more particularly, suitable for use with non-azide generants as well as azide generants within a filter unit of a conventional airbag inflator. The paper composite generally includes activated carbon fibers and inorganic fibers bound together with a latex binder system using conventional paper making techniques and equipment. That is, it has been found that, by incorporating a relatively low percentage of activated carbon fibers with the inorganic fibers commonly used in nonwoven paper composites such as refractory ceramic fibers for use as the filter media in airbag inflators, a filter media can be produced which meets the filtration and performance requirements necessary for use with non-azide generants as well as azide generants.

Most particles produced as by-products in the non-azide chemical combustion reaction which takes place within the inflator unit of an airbag exist as molten liquids or gases. Only a small portion of solid particles is present. Current ceramic paper filtration media containing refractory ceramic fibers and, potentially, a latex binder, do not adequately filter these by-products like they do in azide inflator systems because the molten liquid and gaseous material from the non-azide combustion reaction is far less reactive and chemically different than that of the azide combustion reaction. Generally, it is believed that the by-products are less reactive because of the materials involved. For example, typical azides materials include sodium (Na) whereas most non-azide materials include potassium, which is less reactive that Na. In order to obtain complete filtration of these non-azide by-products, activated carbon fibers are used to chemically react with the molten liquid and/or gaseous by-products and to prevent the expulsion thereof into the airbag.

Preferably, the activated carbon fibers of the present invention have surface activity, and it is this surface activity which chemically interacts with the molten liquid or gaseous by-products in essentially the same manner in which activated carbon filters out impurities in water filters. As a result, and unlike conventional azide filter media where mechanical filtration plays a larger role, chemical filtration is the major determinant for meeting the filtration requirements necessary for use with non-azide generants.

Moreover, without being bound to theory, it is believed that the activated carbon fibers may provide an additional catalytic effect. That is, it is believed by some that the activated carbon fiber/inorganic fiber filter media of the present invention decreases $NO_x$ levels within the filter by converting or reducing $NO_x$ to other $N_2$ combustion products which do not contain $O_2$. It is believed that the carbon from the activated carbon fibers competes with $N_2$ for the free $O_2$. Thus, the resultant by-products include CO and $CO_2$ rather than $NO_x$, to the benefit of the airbag industry.

Essentially any surface activated carbon fibers may be used in the present invention. Moreover, it has been found that a relatively low percent by weight loading levels of these activated carbon fibers is required in order to produce a paper composite having the desired characteristics. Carbon fibers ranging in the amount of from about 5 to about 30 percent by weight are preferred, with about 15 to about 20 percent by weight being more preferred. Typically, in order to be properly processed into paper, these carbon fibers preferably have a length ranging from about one-eighth of an inch (⅛") to about one and a half inches (1 ½").

Preferred surface activated carbon fibers are activated carbon fibers prepared from novoloid fiber precursors. Novoloid fibers are phenolic-based precursors or, more particularly, are three-dimensionally cross-linked phenolic-aldehyde fibers typically prepared by acid-catalyzed cross-linking of a melt-spun novolac resin with formaldehyde. The generic term "novoloid" is recognized as designating a manufactured fiber containing at least 85 weight percent of a cross-linked novolac.

Novoloid fibers are highly flame resistant, but are not high temperature fibers in the usual sense of the term. Practical temperature limits for these fibers for long-term applications are about 150° C. in air and from about 200 to about 250° C. in the absence of oxygen. These fibers have a limiting oxygen index (LOI) in the range of about 30 to 34.

Since novoloid fibers are composed only of carbon, hydrogen, and oxygen, the products of combustion are principally water vapor, $CO_2$, and carbon char. Some CO may be produced in some applications under certain conditions, but other toxic combustion by-products, e.g., HCN, HCI, etc., are not produced. Thus, the toxicity of the combustion products is extremely low. The novoloid fibers display excellent chemical and solvent resistances well as excellent thermal insulating characteristics.

Novoloid fibers are known to be excellent precursors for activated carbon fiber material, having effective, high surface areas (as measured by the Brunauer, Emmett, Teller [BET] method) of 2000 $m^2/g$ or more. Pore configuration and the high surface-to-volume ratio of the fibers, compared to granular activated carbon, permit extremely rapid adsorption and desorption. Although these fibers have a significantly lower tensile strength as compared to carbon pitch and carbon PAN fibers, the fibers also provide strength to the filter media, which can not be provided by granular activated carbon. However, it is believed that granular activated carbon may also be suitable for use in the filtration media in some applications. In comparison with activated carbon fibers produced from other precursors, novoloid-based fibers have significantly higher surface areas, strength, and flexibility.

Novoloid-based carbon fibers are amorphous in structure. They have low modulus and moderate strength, in comparison to the high modulus reinforcing fibers based on polyacrylonitrile (PAN) and pitch. Novoloid-based carbon fibers are soft and pliable, produce little fly or dust on processing, and have good lubricity.

An example of a novoloid-based activated carbon fiber particularly suitable for use in the present invention is available from American Kynol under the trade designation CF-1605-95. For a more detailed description of novoloid fibers and novoloid-based carbon fibers, see Kirk-Othmer: *Encyclopedia of Chemical Technology*, Third ed., Vol.16, pp.125–138, John Wiley & Sons, 1991, the disclosure of which is incorporated herein by reference.

Other activated carbon fibers may also be employed. For example, activated carbon fibers prepared from carbon PAN or carbon pitch fiber precursors may also provide suitable results in some applications. As is known in the art, carbon PAN fibers are obtained from acrylic-based precursor material while pitch fibers are generally obtained from cellulose-based precursor material. Besides the difference in properties in comparison with novoloid-based carbon fibers as set forth hereinabove, these carbon PAN and carbon pitch fibers also produce undesirable outgassing characteristics. Nevertheless, in some instances, use of activated carbon fibers from PAN precursors and pitch precursors may be useful, particularly where cost is an important consideration, since the cost of the novoloid-based carbon fibers is relatively high when compared to its PAN and pitch counterparts. However, because novoloid-based fibers are fired at higher temperature (about 2000° F.) in inert atmospheres such as $N_2$ for longer periods of time (approximately two weeks) than their PAN and pitch counterparts (100–1500° F. for about two days, respectively) during production, it is believed that the novoloid fibers are superior is performance to their PAN and pitch counterparts.

An example of an activated carbon fiber prepared from a PAN precursor is available from American Kynol under the trade designation CT-98.

For the refractory ceramic fibers employed, essentially any known inorganic ceramic fiber useful in the production of a paper composite and suitable for use as a filter media can be used. Many of these inorganic fibers are produced from alumina and silica, such as vitreous aluminosilicate fibers. Alternative useful inorganic fibers include mineral wool fibers, fiberglass, zirconia fibers, zirconia tow, conventional silica fibers, alumina fibers and mixtures thereof. However, it should be understood that this list of fibers is a representative sample only, and that other inorganic fibers may also be suitable for the purposes and under the conditions detailed herein.

The inorganic fibers should preferably have excellent high temperature characteristics and have at least a 90% fiber index (and more preferably, a 95% fiber index), meaning the ceramic fiber portion of the paper composite should have 10% or less shot. Preferably, from about 50 to about 80 percent by weight ceramic fibers are employed in the paper composite.

It will be appreciated that the inorganic fibers useful in the present invention may be controlled in order to control the porosity, basis weight, and flow characteristics of the filter media as desired by the inflator manufacturer. Determination of the type of blend of ceramic fibers to be employed is well within the ordinary skill and routine experimentation of the skilled artisan. That is, selection of the appropriate blend of ceramic fibers in order to determine the porosity, basis weight and flow rate for the filter media of the present invention is routine in this particular art. For example, an increase in porosity and flow rate may be provided by larger fibers, but filtration will corresponding decrease. On the other hand, smaller fibers to increase filtration, but decrease porosity and the rate of flow.

Although any type of ceramic fibers may be employed, clean fibers, i.e., those having less shot than normally found in the production thereof, either spun or blown, and having relatively larger diameter are most preferred. More particularly, aluminosilicate fibers having diameters of between about 2 and 7 $\mu$m, and more preferably, between about 4 and 7 $\mu$m and a+50% and desirably, +90% fiber index level, are preferred by the inflator industry.

One particularly useful type of inorganic fiber is the chopped, high purity, spun, aluminosilicate fibers produced by the Unifrax Corporation under the trade designation 7010-C-10.

Essentially any binder system known in the art may be used in the present invention. The binder system for the activated carbon fiber and ceramic fiber mixture provides some strength and flexibility to the composite and, most importantly, holds the ceramic paper together in the green state. That is, the binder system incorporated therein helps to keep the paper composite from cracking or falling apart during process on the papermaking machine and during production of the filter. However, it will be appreciated that, typically, once the paper composite has been suitably prepared as filter media and has been provided with a strengthening support wound around the filter media, the binder may be burned out and will no longer be present. This eliminates the possibility of providing additional volatile or toxic gases to the airbag upon use.

In order to make the paper composite crack-resistant, any of a plurality of organic binder materials are preferred. The organic latex binder used in the present invention is preferably added to the mixture of carbon and inorganic fibers in an amount ranging from about 2 to about 10 percent by weight, preferably at about 6 percent by weight.

Particularly preferred are acrylic polymers containing only carbon, hydrogen, and oxygen. Binders which contain nitrogen or halogens are less preferred in view of their toxic combustion outgassing during inflator use. In the preferred embodiment, an anionic emulsion of an acrylic latex polymer in water is used. This acrylic ester copolymer provides most, if not all, of the desired characteristics of a binder for the present invention, and is available from various companies, including BASF, B.F. Goodrich, Dow Chemical, Reichhold, Air Products, and National Starch.

In addition, other ingredients commonly used in producing papers composites may be included in the production of the paper composite of the present invention. These ingredients, however, are processed out of the paper composite, and therefore, are not present in the resultant product. Specifically, ingredients such as flocculent, e.g., as alum (aluminum sulfate), a drainage retention aid polymer, and a dispersant may be included. It should be understood, however, that other commonly used ingredients may be employed without departing from the spirit of the invention as claimed hereinbelow.

As commonly known, flocculents are used to precipitate the organic latexes onto the surface of the fibers. Drainage retention aid polymers, are used to pull the coated fibers together and allow any free water to be removed. Dispersants such as polyethylene oxide may be used to aid mixing the fibers.

Preferably, the paper composite includes from about 50 to about 80 percent by weight inorganic fibers and from about 5 to about 30 percent by weight activated carbon fibers, and from about 2 to about 10 percent by weight of the binder. The resultant filter media paper composite preferably has a thickness at 4 psf ranging from about 0.06 to about 0.14 inches and basis weight of from about 115 to about 190 pounds per 3000 square feet, although these preferences are established from the permeability and design needs of the airbag inflator manufacturers, and can vary to practically any thickness or basis weight required in the art.

Preferably, the activated carbon fiber and refractory ceramic fiber paper composites disclosed herein have a tensile strength of at least about 400 grams per inch, preferably about 1000 grams per inch, a flow rate (permeability) of at least 40 cubic feet per minute, and a fiber index of at least 90 percent.

Lower tensile strength can be tolerated if the paper possesses good handleability, such as good elongation or elasticity without breakage. The permeability is also a feature of the porosity of the paper required for the applications set forth below. Specifically, flow rates of less than 40 cubic feet per minute are associated with nonporous or insufficiently porous paper, and therefore, will not work in the high-flow applications noted herein. Preferably, a flow rate of at least 80 cubic feet per minute is desired.

The paper composites of the present invention may have utility in a wide variety of applications and are especially useful as inflator filter units in automotive airbags where high temperature resistance as well as strength and flexibility are required. In light of the fact that non-azides are less expensive, lighter, smaller, and more environmentally friendly than their azide predecessors, the use of the filter media of the present invention would appear to be economically and commercially viable as well as advantageous over the prior art.

One representative form of an airbag module is indicated generally by the numeral 10 in FIG. 1. It will be appreciated that all of the elements of airbag module 10 can take any form commonly known in the art, except where expressly stated herein. Thus, airbag module 10 is one commonly used in the art. It includes a bag 12 and an inflator body 14. As shown and for ease of description, inflator body 14 is cylindrical. It should be understood, however, that the shape of inflator body 14, while conventional in the art, may or may not affect the shape and design of the elements included in module 10.

Positioned radially centrally within inflator body 14 is an ignitor 16 which may be operatively connected to a sensor (not shown) which is capable of detecting a collision or other incident. The sensor is connected to a diagnostic module or computer (also not shown) which, in turn, providing some signal means to the ignitor 16 when inflation of the airbag is warranted. Radially outward from ignitor 16 is pressure vessel 18 containing a generant or propellant (not shown) which, when ignited, releases an inflation gas such as nitrogen. As noted above, the preferred propellant or generant (not shown) to be used within the inflator is a nonazide generant, although azide generants may also be utilized. The generant is compressed into solid pellets or wafers. Vessel 18 preferably has a plurality of apertures 26 relatively low through its outer wall 24 to permit the gas released by the propellant to escape. The gas then travels through an inflator filter 22 near the periphery of inflator body 14 and into bag 12. Filter 22 includes the ceramic paper composite of the present invention which is encapsulated in wire mesh support 28 to enable the filter paper to withstand the outburst of gas. The wire mesh support 28 may include a metal mesh, metal fleece, expanded metals and mixtures thereof, etc. Without this support, the filter media would be blown away by the inflator blast.

Accordingly, in use, as soon as a collision is detected by the sensor, an electric impulse is sent to ignitor 16 which triggers a thermo-chemical reaction by igniting the preferably nonazide generant which, in turn, causes nitrogen or some other inert inflation gas to be expelled and blasted outwardly through apertures 26 at temperatures reaching approximately 2000° F. The inflation gas passes through filter 22, being cooled to about 200° F., and inflates bag 12 in about 1/40th of a second.

Thus, the ceramic paper of filter 22 performs at least three functions during this operation. First, it chemically and/or mechanically entraps any unreacted particles used to form, or ash resulting from the formation of, the inflation gas. Second, it cools the gas from its extremely high temperatures. And third, it controls the flow rate of the gas. That is, the ceramic filter paper of the present invention has a controlled porosity for allowing the gas to escape at a controlled rate, thus permitting the gas to cool before entering bag 12.

In order to demonstrate practice of the present invention, a 16"×16" handsheet of the paper composite was prepared. Table I sets forth the formulation employed.

TABLE I

| Formulation(s) for Carbon Fiber/Ceramic Fiber Paper Composite | | | |
|---|---|---|---|
| Material | Amount | % Solids | Mixing Time |
| $H_2O$ (22° C.) | 12 L | — | — |
| Dispersant[a] | 1.5 L | 1 | 1 min. |
| Activated Carbon Fibers[b] | 7.47 g | 19.50 | 1 min. |
| Ceramic Fiber (Washed)[c] | 27.65 g | 72.25 | 1 min. |
| Latex Binder[d] | 4.3 ml | 6 | 2 min. |
| Alum (10% Solids) | 3.7 ml | 1 | 1 min. |
| Drainage Retention Aid[e] | 9.3 ml | 0.25 | 2 min. |
| Totals | 38.24 dry gms. | 100 | 8 min. |

[a] sodium polymethacrylate and water
[b] used two kind of fibers
(1) prepared from novoloid fiber precursors (CF-1605-95 available from American Kynol) and
(2) prepared from PAN fiber precursors (CT-98 available from American Kynol)
[c] aluminosilicate fibers produced by Unifrax Corporation under trade designation 7010C-10
[d] anionic emulsion of acrylic polymer in water
[e] acrylamide modified cationic polymer in a water and hydrocarbon solvent These components were added to a 5 L mixing vessel in the order that they appear above. The slurry was then mixed at 400 rpm with a bench top lab mixer manufactured by Lightnin. After each component addition, the resulting slurry was allowed to mix for the time (in minutes) noted in Table I hereinabove prior to the addition of the next component. After the last component was added, the slurry was allowed to mix for another 2 minutes before the mixer was shut off. The slurry was then poured into the 16"×16" vacuum caster and dewatered under 15 inches Hg vacuum. The resulting sheet was then couched with blotter paper and transferred to an oven for drying at 120° C. for two hours.

Having produced the paper composite, it was subjected to the tests listed in the Tables II and III hereinbelow. As indicated in Table II, the tests of the above ceramic papers indicated that the paper was fairly light and had a relatively high permeability. Composite papers according to the present invention possess these and other characteristics as set forth herein and are particularly suitable for use in airbag inflator filter units.

TABLE II

Physical Properties of Novoloid-based Carbon Fiber/Ceramic Fiber Paper Composite

| Example No. | Thickness @ 4 psf (in.) | Thickness @ 4 psf (mm) | Part Weight (g) | Basis Weight (g/sq. meter) | Basis Weight (lbs./3,000 sq. ft.) | Density (pcf) | Pressure Drop (mm H$_2$O) |
|---|---|---|---|---|---|---|---|
| 1 | 0.088 | 2.228 | 5.46 | 199 | 122 | 5.58 | 4.92 |
| 2 | 0.086 | 2.174 | 5.50 | 201 | 123 | 5.73 | 4.82 |
| 3 | 0.089 | 2.256 | 5.59 | 204 | 125 | 5.64 | 4.95 |
| 4 | 0.091 | 2.299 | 5.50 | 201 | 123 | 5.45 | — |
| 5 | 0.090 | 2.276 | 5.40 | 197 | 121 | 5.40 | — |
| 6 | 0.094 | 2.383 | 5.63 | 202 | 124 | 5.28 | — |
| 7 | 0.087 | 2.215 | 5.43 | 198 | 122 | 5.58 | — |
| 8 | 0.091 | 2.316 | 5.58 | 201 | 125 | 5.48 | — |
| 9 | 0.100 | 2.248 | 5.73 | 210 | 129 | 5.15 | — |
| Average | 0.091 | 2.299 | 5.53 | 202 | 124 | 5.48 | 4.90 |
| Std. Deviation | 0.004 | 0.105 | 0.10 | 4 | 2 | 0.18 | 0.06 |
| Preferred Range | 0.06–0.14 | 1.52–3.56 | — | — | 115-135 | — | 4.3–6.1 |

TABLE III

Physical Properties of PAN-based Carbon Fiber/Ceramic Fiber Paper Composite

| Example No. | Thickness @ 4 psf (in.) | Thickness @ 4 psf (mm) | Part Weight (g) | Basis Weight (g/sq. meter) | Basis Weight (lbs./3,000 sq. ft.) | Density (pcf) | Pressure Drop (mm H$_2$O) |
|---|---|---|---|---|---|---|---|
| 1 | 0.105 | 2.464 | 5.58 | 204 | 125 | 5.16 | 4.92 |
| 2 | 0.097 | 2.268 | 5.49 | 200 | 123 | 5.51 | 4.82 |
| 3 | 0.089 | 2.299 | 5.63 | 205 | 126 | 5.58 | 4.95 |
| 4 | 0.091 | 3.114 | 5.25 | 191 | 118 | 3.84 | |
| 5 | 0.123 | 2.322 | 5.74 | 209 | 129 | 5.63 | |
| 6 | 0.091 | 2.720 | 5.52 | 201 | 124 | 4.62 | |
| 7 | 0.107 | 2.733 | 5.52 | 201 | 124 | 4.60 | |
| 8 | 0.108 | 2.272 | 5.57 | 203 | 125 | 4.93 | |
| Average | 0.101 | 2.561 | 5.54 | 202 | 124 | 4.98 | 4.90 |
| Std. Deviation | 0.011 | 0.270 | 0.13 | 5 | 3 | 0.58 | 0.06 |

Thus it should be evident that the ceramic papers of the present invention and its method of manufacture thereof are highly effective in providing the necessary porosity, strength and flexibility properties required for a wide variety of applications. The invention is particularly suited for use as a filter in the inflator unit of an automotive airbag.

However, in order to meet the filtration requirements necessary for use with non-azide generants, the paper composites of the present invention were tested and compared to other non-activated carbon fiber containing materials, including one sample (Sample C-1) which employed one ply of carbon fibers and a second ply of refractory ceramic fibers. All other materials tested were single-ply composites. Sample C-2 is believed to contain 15 percent PAN carbon fibers (non-activated) and Sample C-3 is believed to contain 25 percent PAN carbon fiber (non-activated). Sample A contains 20 percent novoloid-based activated carbon fibers in accordance with the concepts of the present invention.

Testing of these samples was carried out by firing off non-azide inflators and measuring the peak exit gas pressure ($P_{max}$) and the total weight of inflator combustion by-products (particulate) that made its way through the filters and into the airbag itself (residue weight). The results of this test are shown in Table IV hereinbelow.

TABLE IV

Filtration Test Results

| Sample | Residue Wt. (g) | Pmax |
|---|---|---|
| C-1 | 1.12 | 461 |
| C-2 | 0.99 | 458 |
| C-3 | 0.91 | 453 |
| A | 0.87 | 466 |

As shown in Table IV, the filter media (Sample A) prepared in accordance with the present invention resulted in a lower residue weight and higher peak pressure than the other filter media. Inflator manufacturers desire filters having low residue weights with high peak pressures ($P_{max}$) because this means that the filter paper filtered out more of the unwanted inflator combustion by-products from the gas stream (shown by the lower residue weight), but, at the same time, also allowed more N$_2$ gas to pass through the filter (shown by the higher $P_{max}$). It will be appreciated that these two parameters usually compete with one another because better filtration usually means a more restrictive filter which is less permeable and which, in turn, yields less gas flow. However, this is not the case with the filter of the present invention. The sample product of the present invention exhibited a lower residue weight as well as a higher peak pressure that any of the other filters tested. Inflator manufacturers particularly desire this result since it could mean that there is the potential for decreasing the amount of non-azide propellant charge in the inflator, thereby further reducing the cost of the inflator unit.

Thus, it should be evident that the paper composite of the present invention is highly efficient and meets the filtration and performance requirements necessary for use as a filter media with non-azide, as well as azide, generants in the inflator unit of an automotive airbag. It will be appreciated that the carbon and ceramic fiber paper composite and filter media of the present invention can be used separately with other equipment and the like and that the composite need not necessarily be produced by the conventional papermaking techniques described herein. Moreover, the carbon and ceramic fiber paper composite and filter media of the present invention can be used in household as well as other industrial applications, including being used in heating elements and kilns.

Based upon the foregoing disclosure, it should now be apparent that the use of the paper composite described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A single-ply paper composite comprising activated carbon fibers, inorganic fibers and a binder for holding said carbon fibers and said inorganic fibers together, wherein said single-ply paper composite has a tensile strength of about 400 to about 1000 grams/inch and a permeability of at least 40 cubic feet/minute.

2. The paper composite of claim 1, comprising from about 5 to about 30 percent by weight activated carbon fibers, from about 50 to about 80 percent by weight inorganic fibers, and from about 2 to about 10 percent by weight latex binder.

3. The paper composite of claim 1, wherein said inorganic fibers are selected from the group consisting of aluminosilicates, mineral wool, fiberglass, zirconia, zirconia tow, conventional silica, alumina and mixtures thereof.

4. The paper composite of claim 1, wherein said carbon fibers are novoloid-based surface activated carbon fibers.

5. The paper composite of claim 1, wherein said organic latex binder is an acrylic latex.

6. The paper composite of claim 1, wherein said paper fibers have an effective surface area (BET method) of at least 2000 $m^2/g$.

7. The paper composite of claim 1, wherein said carbon fibers chemically filter by-products of a combustion reaction of non-azide generant materials.

8. The paper composite of claim 1, wherein said inorganic fibers have a diameter ranging from about 2 to 7 $\mu$m and a fiber index level of at least 50%.

9. A filter media for use in an inflator unit of an airbag comprising:

a paper composite containing carbon fibers and inorganic fibers, wherein the filter media has a tensile strength of about 400 to about 1000 grams/inch and a permeability of at least 40 cubic feet/minute.

10. The filter media of claim 9, wherein said inorganic fibers are selected from the group consisting of aluminosilicates, mineral wool, fiberglass, zirconia, zirconia tow, conventional silica, alumina and mixtures thereof.

11. The filter media of claim 9, wherein said carbon fibers are novoloid-based surface activated carbon fibers.

12. The filter media of claim 9, wherein said carbon fibers have an effective surface area (BET method) of at least 2000 $m^2/g$.

13. The filter media of claim 9, wherein said paper composite ranges from about 0.06 inches (0.152 cm) to about 0.14 inches (0.356 cm) in thickness.

14. The filter media of claim 9, wherein the inflator unit of the airbag employs non-azide generants and said carbon fibers chemically filter by-products of a combustion reaction of said non-azide generants.

15. The filter media of claim 9, wherein said inorganic fibers have a diameter of from about 2 $\mu$m to about 7 $\mu$m and a fiber index level of at least 50%.

16. A filter for use in an inflator unit of an automotive airbag comprising the filter media of claim 9, and further comprising a strengthening support wound around said filter media.

17. The filter of claim 16, wherein said strengthening support is selected from the group consisting of metal mesh, metal fleece, expanded metals and mixtures thereof.

18. A filter for use in an inflator unit of an automotive airbag comprising a paper composite including activated carbon fibers, an inorganic fibers.

19. The filter of claim 18, wherein said filter is positioned radially outwardly of an ignitor located within a pressure vessel containing a generant such that when said ignitor ignites said generant, a reaction occurs and an inflation gas expels from said pressure vessel and through said filter.

20. The filter of claim 19, wherein said generant is a non-azide generant.

21. The filter of claim 18 further comprising a strengthening support wound around said paper composite.

22. The filter of claim 21, wherein said strengthening support is selected from the group consisting of metal mesh, metal fleece, expanded metals and mixtures thereof.

23. The filter of claim 18, wherein said inorganic fibers are selected from the group consisting of aluminosilicates, mineral wool, fiberglass, zirconia, zirconia tow, conventional silica, alumina and mixtures thereof.

24. The filter of claim 18, wherein said carbon fibers are novoloid-based surface activated carbon fibers.

25. The filter of claim 18, wherein said paper composite ranges from about 0.06 inches (0.152 cm) to about 0.14 inches (0.356 cm) in thickness.

26. The filter of claim 20, wherein said carbon fibers chemically filter by-products of a combustion reaction of said non-azide generants.

27. The filter of claim 18, wherein said carbon fibers have an effective surface are (BET Method) of at least 2000 $m^2/g$.

28. The filter of claim 18, wherein said inorganic fibers have a fiber index level of at least 50%.

* * * * *